US012688024B2

(12) United States Patent
Tenace

(10) Patent No.: US 12,688,024 B2
(45) Date of Patent: Jul. 21, 2026

(54) PSEUDOCODE TO HARDWARE DESCRIPTION LANGUAGE (HDL) TRANSLATION

(71) Applicant: Primis, Inc., Los Gatos, CA (US)

(72) Inventor: Valerio Tenace, Turin (IT)

(73) Assignee: Primis, Inc., Los Gatos, CA (US)

( * ) Notice: Subject to any disclaimer, the term of this patent is extended or adjusted under 35 U.S.C. 154(b) by 184 days.

(21) Appl. No.: 18/400,202

(22) Filed: Dec. 29, 2023

(65) Prior Publication Data

US 2024/0256240 A1     Aug. 1, 2024

Related U.S. Application Data

(60) Provisional application No. 63/436,296, filed on Dec. 30, 2022.

(51) Int. Cl.
*G06F 8/51*              (2018.01)

(52) U.S. Cl.
CPC ..................................... *G06F 8/51* (2013.01)

(58) Field of Classification Search
CPC ......................................................... G06F 8/51
USPC .................................. 717/104–114, 136–137
See application file for complete search history.

(56) References Cited

U.S. PATENT DOCUMENTS

| | | | | |
|---|---|---|---|---|
| 8,689,192 | B2 * | 4/2014 | Dargelas ................. | G06F 40/51 |
| | | | | 717/136 |
| 10,747,958 | B2 * | 8/2020 | Nelson .................. | G06F 40/284 |
| 11,900,261 | B2 * | 2/2024 | Clement .................. | G06F 8/51 |
| 12,026,474 | B2 * | 7/2024 | Sikka ...................... | G06F 40/20 |

OTHER PUBLICATIONS

Ma et al., "ALAMO: FPGA acceleration of deep learning algorithms with a modularized RTL compiler", 2018, Elsevier, pp. 14-23. (Year: 2018).*
Synapticad, "EASE Block and State Diagram HDL Entry", 2021, retrieved from https://www.syncad.com/hdlworks_ease_block_diagrams.htm , 5 pages. (Year: 2021).*

(Continued)

*Primary Examiner* — Ted T. Vo
(74) *Attorney, Agent, or Firm* — Thorpe North & Western, LLP.; Steve M. Perry

(57) ABSTRACT

Technology is described for translating natural language to a hardware description language (HDL). The method can include receiving a plurality of pseudocode statements that include natural-language terms for a high-level representation of hardware behavior. Another operation may be extracting context information from the pseudocode statements based in part on context relationships defined in the plurality of pseudocode statements between parent pseudocode statements and inner context pseudocode statements. Lines of pseudocode may be stored in nodes in a context dependency graph, which is ordered using the context relationships from the context information. A pseudocode statement from each node in the context dependency graph can be translated into HDL code modules using a deep neural network. The HDL code modules can be ordered based on the context dependency graph to provide a listing of HDL source code.

20 Claims, 8 Drawing Sheets

(56) References Cited

OTHER PUBLICATIONS

Hwang et al., "ASimOV: A Framework for Simulation and Optimization of an Embedded AI Accelerator", 2021, Micromachines, 12 pages. (Year: 2021).*
Thakur et al., "Benchmarking Large Language Models for Automated Verilog RTL Code Generation", 2022, arXiv, 7 pages. (Year: 2022).*

* cited by examiner

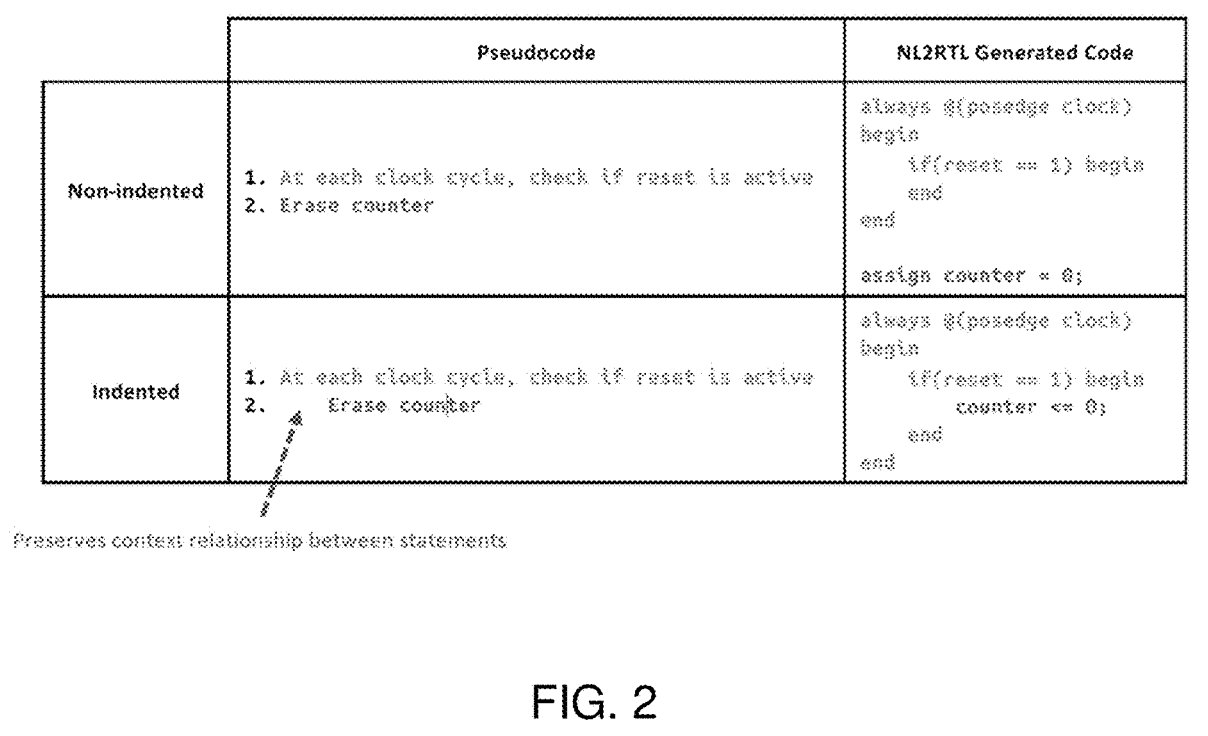

| | Pseudocode | NL2RTL Generated Code |
|---|---|---|
| Non-indented | 1. At each clock cycle, check if reset is active<br>2. Erase counter | always @(posedge clock)<br>begin<br>    if(reset == 1) begin<br>    end<br>end<br><br>assign counter = 0; |
| Indented | 1. At each clock cycle, check if reset is active<br>2.     Erase counter | always @(posedge clock)<br>begin<br>    if(reset == 1) begin<br>        counter <= 0;<br>    end<br>end |

Preserves context relationship between statements

FIG. 2

Table 1: *Statistics of the adopted dataset.*

| Syntax | N. of examples |
|---|---:|
| Module definition | 600 |
| Wire declarations | 800 |
| Conditional if statements | 1200 |
| assign statements | 3200 |
| Arithmetic and logic operations | 2800 |
| Registers and memory components | 800 |
| always statements | 400 |
| Total | 9800 |

FIG. 3

PSEUDOCODE TO HARDWARE DESCRIPTION LANGUAGE (HDL) TRANSLATION

PRIORITY CLAIM

This patent application claims priority to U.S. Provisional Patent Application Ser. No. 63/436,296, filed on Dec. 30, 2022 entitled "PSEUDOCODE TO HARDWARE DESCRIPTION LANGUAGE (HDL) TRANSLATION".

BACKGROUND

Programming serves as a versatile tool for addressing challenges in computing, and is widely employed across scientific, industrial, and everyday contexts. With the expanding usage of electronic devices, the necessity for proficient programming skills has surged, alongside a growing call for advanced tools aimed at enhancing programmer efficiency.

In recent years, the field of code generation and Natural Language (NL)-to-code translation has garnered significant interest. Typically, neural network text generation models, such as autoregressive language models or sequence-to-sequence models, produce text by sequentially selecting words, with each word being dependent on its predecessor. These models have shown proficiency in a variety of applications, including machine translation, summarization, and code-related tasks. Of particular note, the advent of transformer-based models, such as CodeT5 and CodeBERT, alongside GPT models, has marked a notable advancement in the realm of code autocompletion, demonstrating their effectiveness in this domain.

BRIEF DESCRIPTION OF THE DRAWINGS

FIG. 2 is a table illustrating an example of non-indented vs. indented pseudocode that provides context information.

FIG. 3 is a table illustrating an example of an overview of examples in a simple dataset for training a deep neural network.

DETAILED DESCRIPTION

Figure 1:
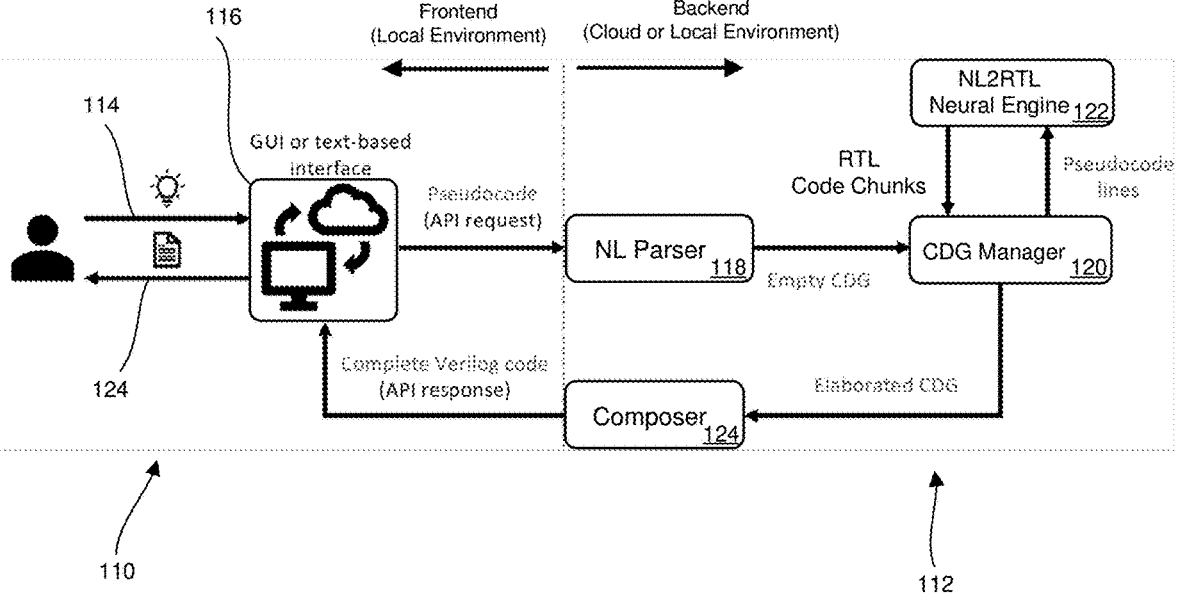
FIG. 1 is a block diagram illustrating an example of functionality for translation of natural language to Register Transfer-Level (RTL) design.

Reference will now be made to the examples illustrated in the drawings, and specific language will be used herein to describe the same. It will nevertheless be understood that no limitation of the scope of the technology is thereby intended.

Alterations and further modifications of the features illustrated herein, and additional applications of the examples as illustrated herein, which would occur to one skilled in the relevant art and having possession of this disclosure, are to be considered within the scope of the description.

The present technology may use AI-enabled programming tools to significantly reduce the time used to create a prototype for a project and provide positive effects on the development costs. More specifically, this technology may be applied to Register-Transfer Level (RTL) design which can result in a Natural Language (NL)-to-RTL machine translation framework. A pseudocode-to-RTL development framework may be provided for synthesizable RTL (e.g., Verilog Code, VHSIC Hardware Description Language (VHDL), or another hardware definition language (HDL)). When receiving complex statements organized as pseudocode, this process and system can produce fully-compliant RTL (e.g., Verilog) descriptions that can be synthesized into low level circuit designs (i.e., netlists) without human intervention.

FIG. 1 illustrates the system level functionality of the proposed development framework. The system may include a frontend 110 and a backend section 112 of the system. The frontend 110 may be a means to allow the user to interact with the backend 112 processing and services, which includes the core of the development process and system. In the following, both aspects are discussed but a focus is placed on the backend.

The input of the user 114 can either be processed via a GUI interface or a text-based application interface 116. In both cases, a pseudocode statement may be sent enveloped in an API request (either towards a local or Cloud-based backend service). The pseudocode statement is then first processed by means of the NL (Natural Language) parser 118 and the Context Dependency Graph (CDG) manager 120 to extract context information that enables the NL-to-RTL neural engine 122 to produce Verilog code chunks/or snippets. The code chunks may be eventually assembled through the composer 124 and the resulting code 124 is returned to the user (e.g., via an API response).

The backend may be comprised of a number of different components, including: (1) a pseudocode parser or natural language parser 118, which may be configured for processing the user's inputs, as well as for generating context relationships among different pseudocode statements or lines by leveraging Context Dependency Graphs (CDGs); (2) a transformer model that constitutes the NL-to-RTL neural engine 122, namely, a neural network specifically trained and fine-tuned on NL-to-RTL (e.g., Verilog) translation tasks; (3) a CDG manager 120 that directs NL phrases or queries towards the neural engine, and collects and organizes responses inside the CDG; and (4) a composer 124 that represents the last step that glues together the different Verilog code snippets generated by the NL-to-RTL neural engine, thus yielding the final code to the end user.

Parser and Context Dependency Graphs

As already mentioned, the NL-to-RTL framework accepts natural-language input sequences that constitute a high-level representation of the behavior of the RTL, which the end user wants to obtain. In order to create a flexible development experience, the framework does not constrain the code complexity implied in each pseudocode statement. This may mean that some pseudocode statements could simply translate to a single line of Verilog code. However, more often than not, especially as system design complexity increases, or simply to achieve a more readable and compact pseudocode, a single NL line may yield a multi-line Verilog snippet.

This complex scenario is generally incompatible with a straightforward line-wise translation of pseudocode statements, mainly due to context issues when subsequent commands have nested dependencies.

To solve this challenge, pseudocode indentation can be used to convey context relationships. FIG. 2 illustrates an example of non-indented vs. indented pseudocode. The top row illustrates how related, but non-indented, statements can lead to erroneous code predictions by machine learning. The bottom row illustrates the expected pseudocode syntax which can be generated with the indenting that provides context for the pseudocode. In the example of FIG. 2, the user may want to initialize a counter whenever the reset signal is active. The parser module may rely on the following context rule: whenever lines are indented, cascading statements may belong to the inner context of the parent statement.

To better understand how this context relationship is handled internally by the framework, context variables can be used. A context variable or context record is a data structure that may be composed of at least three different fields: (1) a description field, namely, a statement of pseudocode that describes one or more Verilog statements; (2) a body field, where the Verilog code equivalent to the description is stored; and (3) one or more pointers to other context variables that represent the inner context, i.e., different pieces of Verilog code that depend upon the parent context. An ensemble of multiple and connected context variables or context records can represent the nodes that may be referred to as a context dependency graph (CDG). For example, a context dependency graph (CDG) may be a hierarchical data structure that is some form of linked data structure, such as a tree structure with any number of nodes and branches at each level of the tree. Other example types of hierarchical structures used for this application may be hierarchical databases, hashing, hash trees, heaps, stacks, linked lists, tries, hierarchical arrays and other hierarchical structures.

The main objective of the NL parser is to analyze the pseudocode statements individually and then sequentially in order to build, and keep track of, context dependencies between different statements by means of a CDG. The initially obtained CDG may be considered "empty", namely, the CDG contains the corresponding pseudocode statement or line in the description (for each line there is only one context variable) and pointers to other nodes in inner_context, where applicable. The body field can be populated by the CDG Manager, as described later.

Neural Engine Transformer

The AI technology that drives the framework's core functionalities may rely on a dedicated encoder-decoder transformer that is a deep neural network. Overall, the transformer generally follows previously existing transformer model structures that have been successfully exploited in machine translation tasks. First, an input sequence of tokens is mapped to a sequence of embeddings. These constitute the input of the encoder, where the latter consists of a stack of hierarchical components, each of which comprises two different modules: a self-attention layer followed by a feed-forward network. Layer normalization is applied to the input of each module, followed by the addition of the module's input to its output through a residual skip connection. Dropout is strategically utilized within the feed-forward network, on the residual skip connections, as well as at the input and output of the entire stack. Similarly, the decoder mirrors the encoder's structure, looping its output tokens back to its input.

The transformer can be specifically trained for NL-to-RTL (e.g., Verilog) translation tasks. This may be accomplished with an ad hoc training procedure that leverages a semi-automatic dataset build routine. The routine crawls a handcrafted list of webpages that are renowned for storing large quantities of source code in different languages, e.g., GitHub and StackOverflow, among others. An example of a limited Verilog syntax knowledge model may use a few common statements that can be easily used to produce simple, but nonetheless meaningful, RTL applications. Table 1 in FIG. 3 reports an overview on a simple dataset, where for each Verilog construct included in the dataset (see the Syntax column), the total number of included example code chunks or snippets is indicated (column N. for the number of examples). In total, the dataset contains almost 10 k Verilog code snippet examples. The training routine may be composed of two sequential steps. First, the transformer may be trained on the Colossal Clean Crawled Corpus2 or another large text corpora. This prepares the model to execute the downstream language-to-language translation task more efficiently. The final fine-tuning training phase is then accomplished by leveraging or training using the simplified Verilog dataset.

CDG Manager and Composer

The CDG manager may represent the main process of the backend system. The CDG manager may receive a CDG out of the initial parser stage where each node of the CDG contains a pseudocode line in the description field of the node, and the CDG manager's main role is to perform a depth-first traversal of the CDG. At each step, the CDG manager (See FIG. 1 at 120) may populate individual vertices by issuing queries to (by using the description field as the query string) and collecting responses from the neural engine. Once the entire CDG is populated, the composer may be triggered. Once again, the CDG may be visited in a depth-first fashion. For each vertex, the content of child nodes can be appended to the body of their respective parent nodes. This operation may be carried out simply by replacing a positional placeholder character in parent nodes via traditional string search and replace routines or by using links in a post-order tree traversal or another tree traversal for assembling the code blocks in the appropriate order. For example, if the initial CDG is manipulated to obtain an isomorphic version of the CDG, then selecting the traversal pattern for the CDG may be a depend on how nodes are sorted in the isomorphic graph. At the end, once the CDG is visited, the string associated to the root node may be enveloped and returned as an API response to the frontend.

Figure 4:
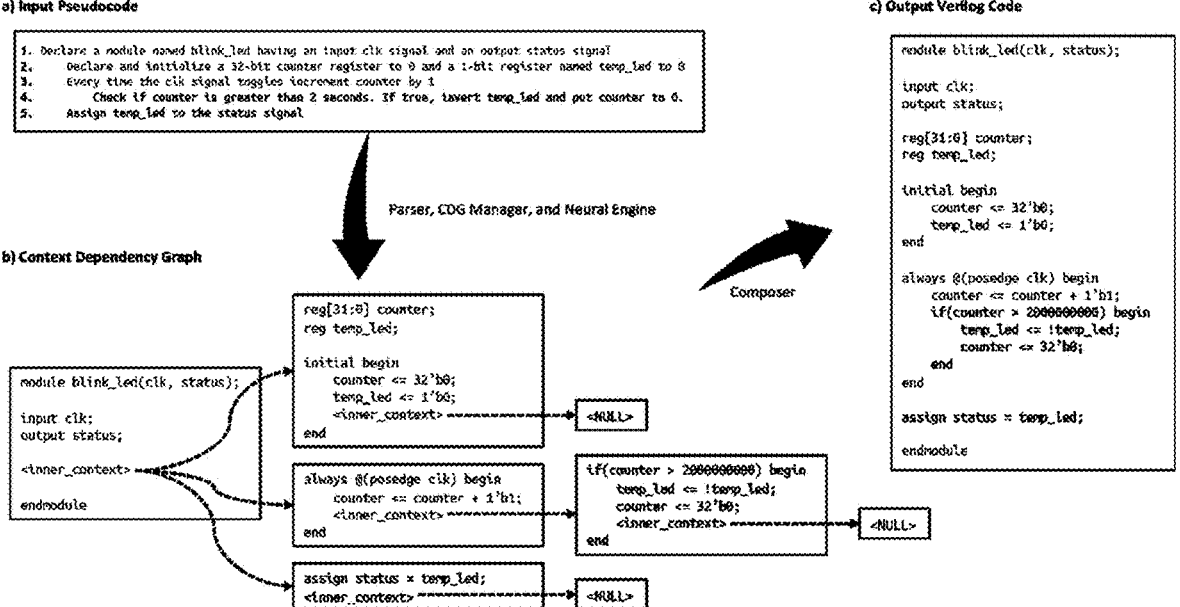
FIG. 4 is a block diagram illustrating an example of a high-level view of a backend workflow for translating natural language to a hardware description language (HDL), such as Verilog.

FIG. 4 is a block diagram illustrating a high-level view of a backend workflow. The input pseudocode (e.g., "a)" in FIG. 4) describes a simple application for controlling the on/off state of a variable that drives an LED in a commercial FPGA board. The operations accomplished by the parser, CDG manager, and the neural engine may lead to the CDG structure depicted in FIG. 4 (e.g., "b)" in FIG. 4), which is finally elaborated by the composer to create the final output of the system (e.g., "c)" in FIG. 4), which is output Verilog code or other HDL languages.

Frontend and User Experience

The frontend may use many different configurations and several different approaches may be used. One frontend configuration may be a simple text-based application gateway to send the input pseudocode to the translation API system, and this configuration is a straightforward interface solution. In another configuration the front end may use a plugin for existing IDEs (Integrated Development Environments) or text editors. A further configuration may use a GUI interface to provide a good overall user experience for entering pseudocode and receiving the output Verilog code or other HDL code (e.g., VHDL—Very High-Speed Integrated Circuit Hardware Description Language).

Figure 5:
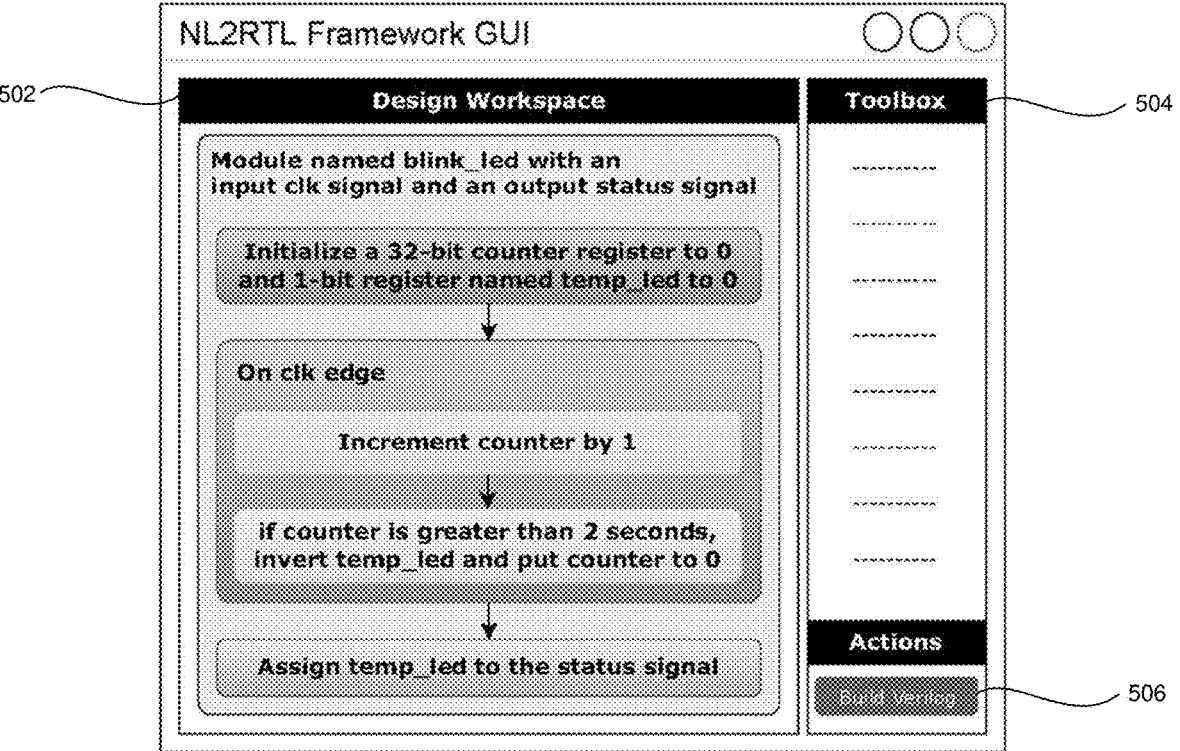
FIG. 5 is an example of a graphical user interface (GUI) for generating a flow chart usable for translating natural language to a hardware description language (HDL).

FIG. 5 depicts an example GUI interface, where the working environment may be represented by the "Design Workspace" section 502. By dragging-and-dropping diagram blocks (either pre-provided blocks, or those that are part of a user library or a third-party vendor library) from the "Toolbox" 504, the user can: (1) establish logical connections between subsequent operations, and (2) generate hierarchical blocks, i.e., blocks that contain sub-blocks in order to maintain context dependencies. These diagram blocks may be graphical icons, flow chart blocks (e.g., function blocks, decision blocks, start blocks, end blocks), or just the names of functions that can be dragged into the design workspace. For each block, the user can specify a functional description in natural language. Upon pressing the "Build Verilog" button 506, the diagram in the "Design Workspace" is converted and annotated into plain text. This will constitute the text-based pseudocode in a clean formatted version that can be sent to the translation API.

To summarize and reiterate, this technology can provide a pseudocode-to-RTL machine translation framework using machine learning (e.g., a deep neural network). The machine translation may support any subset of RTL languages (e.g., a subset of the Verilog syntax) and provide a design-aid solution capable of producing production-grade RTL code.

Figure 6:
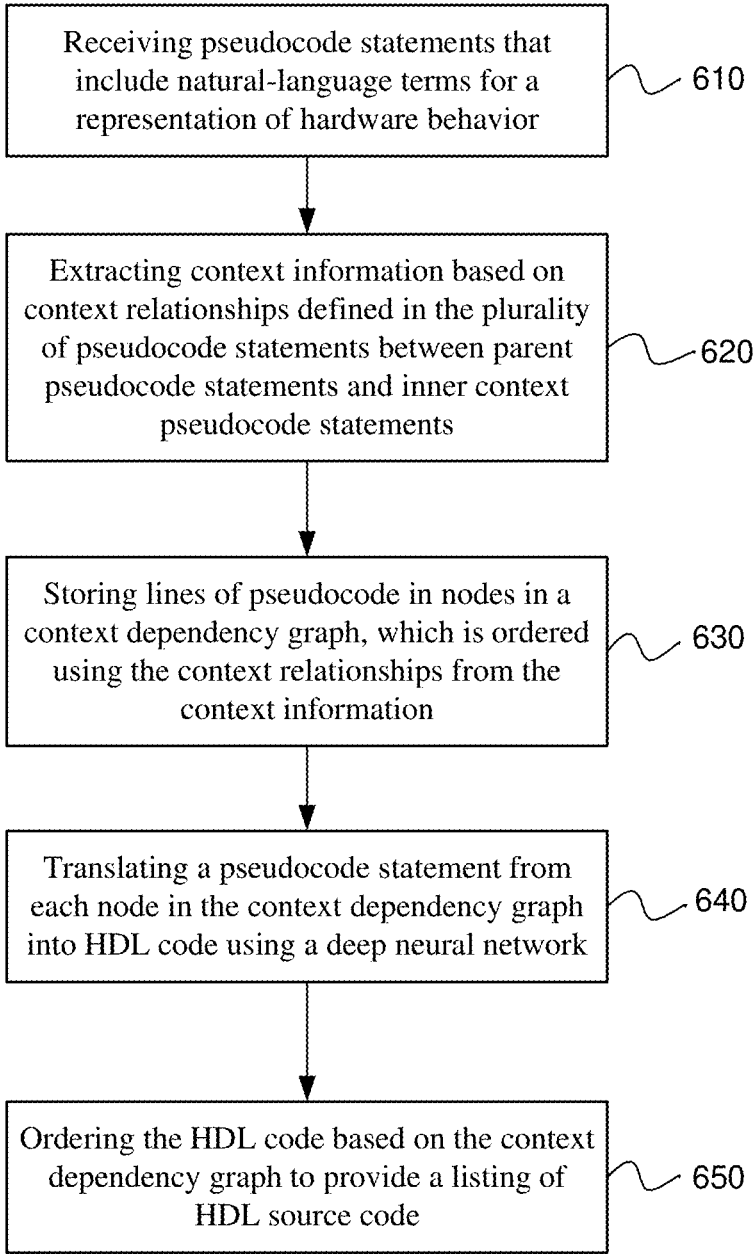
FIG. 6 is a flowchart illustrating an example of a method for translating natural language to a hardware description language (HDL).

FIG. 6 is a flowchart illustrating a method for translating natural language (e.g., pseudocode instructions) to a hardware description language (HDL). The method may include receiving a plurality of pseudocode statements that include natural-language terms for a high-level representation of hardware behavior, as in block 610. The natural language terms are natural words, values and variable definitions used in the pseudocode statements to represent desired hardware functionality.

Context information may be extracted from the pseudocode statements based in part on context relationships defined in the plurality of pseudocode statements between parent pseudocode statements and inner context pseudocode statements, as in block 620. The ability to extract context information from the pseudocode statements may use various context markers, context indicators or context links. More specifically, identifying the context relationships between the plurality of pseudocode statements may be declared using at least one of: text indentation, directional graphical links (e.g., arrows) or symbolic links in the context dependency graph, bullet points, hierarchical text markers, hierarchical graphical markers, URIs (Uniform Resource Identifiers) or other electronic links between pseudocode statements.

Lines of pseudocode may be stored in nodes in a context dependency graph, which is ordered using the context relationships from the context information, as in block 630. The context dependency graph may be stored in memory for a limited time or stored in longer term storage. Each of the nodes in the context dependency graph may store: a description field containing a single line of pseudocode representing at least one HDL operation. The nodes may also include a body field where the HDL source code translation of the single line of pseudocode is stored and a pointer or link to inner context nodes in the context dependency graph that depend on a parent node. Each node may contain one pseudocode statement. The pointer may be a symbolic reference to the node containing the inner context of the parent node or the point may be an actual memory reference to a memory location with a node. The pointer may reference an inner context node that includes or represents pseudo code, HDL source code, and links to children nodes (or termination links or null links) for an inner context for the parent node. The HDL code may be Verilog code, VHSIC Hardware Description Language (VHDL) or another type of HDL code.

A graphical user interface may be provided to display each of the plurality of pseudocode statements in a flowchart based in part on the context information. The graphical user interface may generate a hierarchy of blocks referencing context by nesting inner context nodes within parent nodes to display context for each of the nodes graphically. See FIG. 5 for example. When the pseudocode is being created, the graphical user interface may allow function blocks and function templates to be selected and added to the context dependency graph.

A pseudocode statement from each node in the context dependency graph may be translated into HDL code using a deep neural network, as in block 640. The translation may occur using a deep neural network that is an encoder-decoder transformer, a text-to-text transformer or a generative adversarial network (GAN).

The HDL code may be ordered based in part on the context dependency graph to provide a listing of HDL source code, as in block 650. In one example, the pseudocode statement represents a single high-level logical statement. The graphical user interface may also allow a user to establish logical connections between pseudocode statements using lines, arrows, or links drawn between the nodes. In the case of using lines or arrows, the nodes may not be graphically nested but each parent and child node may appear as its own node, as in part b) of FIG. 4.

Figure 7:
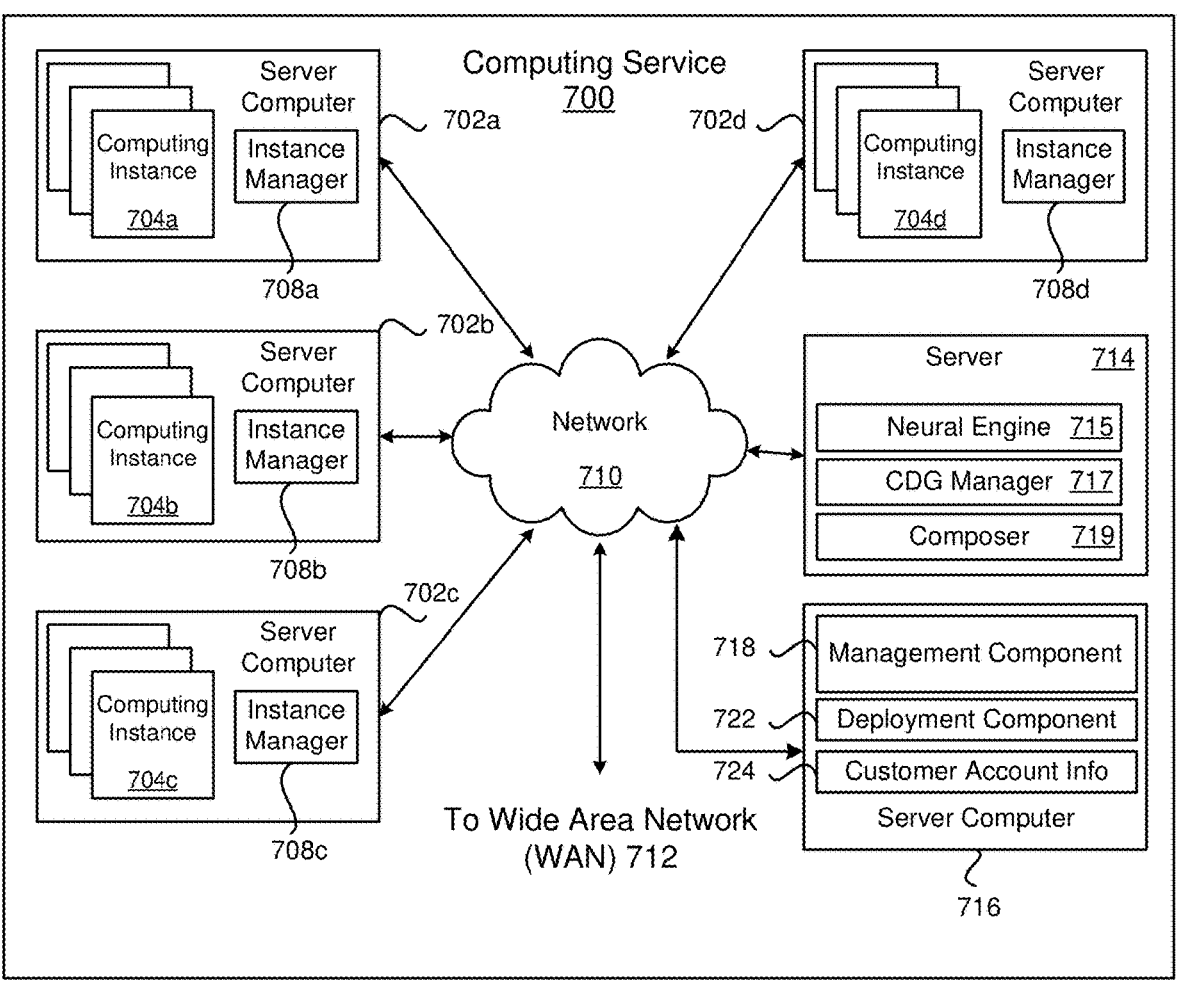
FIG. 7 is a block diagram illustrating an example computing service that may be used to execute and manage a number of computing instances upon which the present technology may execute.

FIG. 7 is a block diagram illustrating an example computing service 700 that may be used to execute and manage a number of computing instances 704*a-d* upon which the present technology may execute. In particular, the computing service 700 depicted illustrates one environment in which the technology described herein may be used. The computing service 700 may be one type of environment that includes various virtualized service resources that may be used, for instance, to host computing instances 704*a-d*.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of customers may operate independently (i.e., a public cloud environment). Generally speaking, the computing service 700 may provide the following models: Infrastructure as a Service ("IaaS") and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 700. End customers may access the computing service 700 using networked client devices, such as desktop computers, laptops, tablets, smartphones, etc. running web browsers or other lightweight client applications, for example. Those familiar with the art will recognize that the computing service 700 may be described as a "cloud" environment.

The particularly illustrated computing service 700 may include a plurality of server computers 702*a-d*. The server computers 702*a-d* may also be known as physical hosts. While four server computers are shown, any number may be used, and large data centers may include thousands of server computers. The computing service 700 may provide computing resources for executing computing instances 704*a-d*. Computing instances 704*a-d* may, for example, be virtual machines. A virtual machine may be an instance of a software implementation of a machine (i.e. a computer) that executes applications like a physical machine. In the example of a virtual machine, each of the server computers 702*a-d* may be configured to execute an instance manager 708*a-d* capable of executing the instances. The instance manager 708*a-d* may be a hypervisor, virtual machine manager (VMM), or another type of program configured to enable the execution of multiple computing instances 704*a-d* on a single server. Additionally, each of the computing instances 704*a-d* may be configured to execute one or more applications.

A server 714 may be reserved to execute software components for implementing the present technology or managing the operation of the computing service 700 and the computing instances 704*a-d*. For example, one server 714 may include a neural engine 715, CDG (Graph) manager 717 and a composer 719 which are operating in the computing service 700.

A server computer 716 may execute a management component 718. A customer may access the management component 718 to configure various aspects of the operation of the computing instances 704*a-d* purchased by a customer. For example, the customer may setup computing instances 704*a-d* and make changes to the configuration of the computing instances 704*a-d*.

A deployment component 722 may be used to assist customers in the deployment of computing instances 704*a-d*. The deployment component 722 may have access to account information associated with the computing instances 704*a-d*, such as the name of an owner of the account, credit card information, country of the owner, etc. The deployment component 722 may receive a configuration from a customer that includes data describing how computing instances 704*a-d* may be configured. For example, the configuration may include an operating system, provide one or more applications to be installed in computing instances 704*a-d*, provide scripts and/or other types of code to be executed for configuring computing instances 704*a-d*, provide cache logic specifying how an application cache is to be prepared, and other types of information. The deployment component 722 may utilize the customer-provided configuration and cache logic to configure, prime, and launch computing instances 704*a-d*. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702*a-d*, 716. The network 710 may be a local area network (LAN) and may be connected to a Wide Area Network (WAN) 712 or the Internet, so that end customers may access the computing service 700. In addition, the network 710 may include a virtual network overlaid on the physical network to provide communications between the servers 702*a-d*. The network topology illustrated in FIG. 7 has been simplified, as many more networks and networking devices may be utilized to interconnect the various computing systems disclosed herein.

Figure 8:
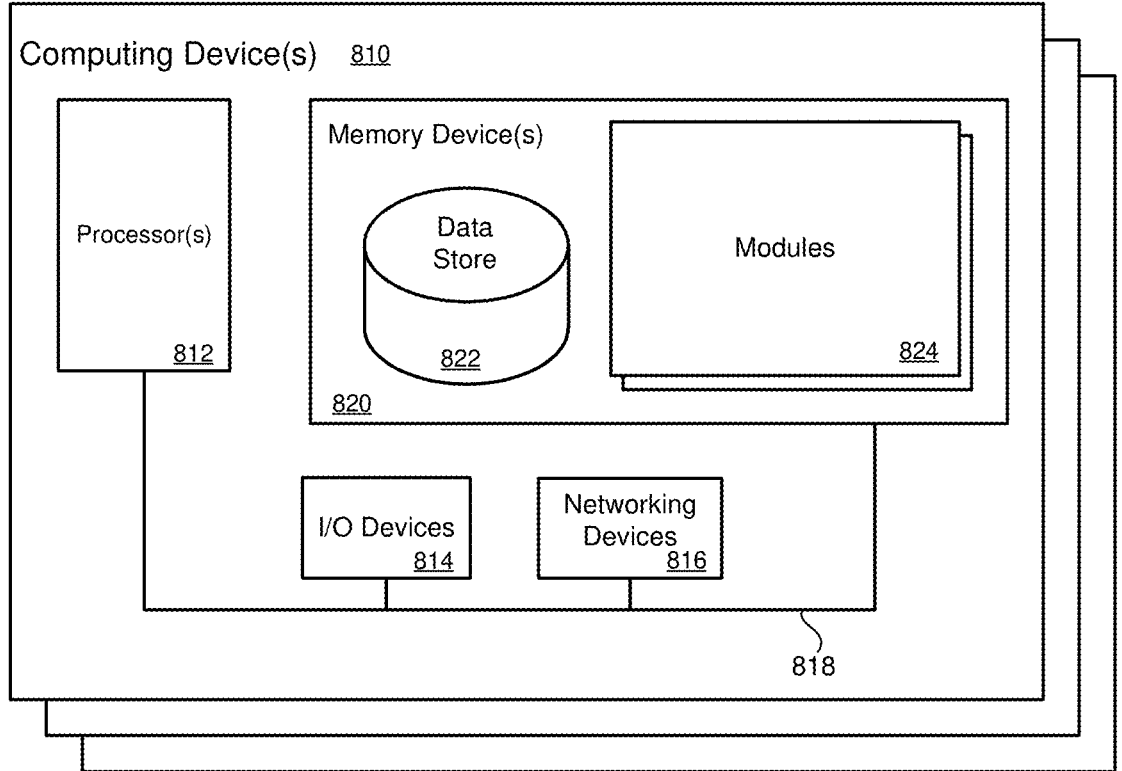
FIG. 8 illustrates a computing device on which modules of this technology may execute.

FIG. 8 illustrates a computing device 810 on which modules of this technology may execute. The computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for translating natural language to a hardware description language (HDL), comprising:

receiving a plurality of pseudocode statements that include natural-language terms for high-level representation of hardware behavior;

extracting context information from the pseudocode statements based in part on context relationships defined for the plurality of pseudocode statements between parent pseudocode statements and inner context pseudocode statements;

storing lines of pseudocode in nodes in a context dependency graph, which is ordered using the context relationships from the context information;

translating a pseudocode statement from at least one node in the context dependency graph into HDL code using a deep neural network; and ordering the HDL code based on the context dependency graph to provide a listing of HDL source code.

2. The method as in claim 1, wherein extracting context information from the pseudocode statements further comprises identifying the context relationships between the plurality of pseudocode statements using at least one of: text indentation, directional graphical arrows or symbolic links in the context dependency graph, bullet points, a hierarchical text marker, a hierarchical graphical marker, URIs (Uniform Resource Identifiers).

3. The method as in claim 1, wherein nodes in the context dependency graph store:

a description field containing a single line of pseudocode representing at least one HDL operation;

a body field where the HDL source code translation of the single line of pseudocode is stored; and a pointer to inner context nodes in the context dependency graph that depend on a parent node.

4. The method as in claim 3, wherein the pointer references an inner context node that represents HDL source code for an inner context within for the parent node.

5. The method as in claim 1, wherein the HDL code is Verilog code or VHSIC Hardware Description Language (VHDL).

6. The method as in claim 1, wherein the pseudocode statement represents a single high-level logical statement.

7. The method as in claim 1, further comprising a graphical user interface to display each of the plurality of pseudocode statements in a flowchart based in part on context information.

8. The method as in claim 7, wherein the graphical user interface generates a hierarchy of blocks referencing context by nesting inner context nodes within parent nodes to display context for the nodes.

9. The method as in claim 7, wherein the graphical user interface enables a user to establish logical connections between pseudocode statements using arrows between nodes.

10. The method as in claim 1, further comprising enabling function blocks and function templates to be selected and added to the context dependency graph.

11. The method as in claim 1, wherein the deep neural network is an encoder-decoder transformer, a text-to-text transformer or a generative adversarial network (GAN).

12. A system for translating natural language to a hardware description language (HDL), comprising:

a natural language parser configured to parse pseudocode statements, which include natural-language terms for a high-level representation of hardware behavior, wherein the natural language parser extracts context relationships between the pseudocode statements;

a graph manager to write each line of pseudocode into a node in a context dependency graph and to order the graph based on the context relationships identified for the pseudocode statements;

a deep neural network to translate the pseudocode from nodes of the context dependency graph into HDL code chunks;

a composer to arrange the HDL code chunks based on dependencies in the context dependency graph in order to provide a listing of HDL source code.

13. The system as in claim 12, further comprising identifying the context relationships between the plurality of pseudocode statements using at least one of: text indentation, directional graphical arrows in the context dependency graph, bullet points, a hierarchical text marker, or a hierarchical graphical marker.

14. The system as in claim 12, wherein each node in the context dependency graph stores:

a description field containing a single line of pseudocode representing at least one HDL operation;

a body field where the HDL source code equivalent to the single line of pseudocode is stored; and a pointer to inner context nodes in the context dependency graph that depend on the parent node.

15. The system as in claim 14, wherein the pointer references an inner context node with HDL source code that represents the inner context of the parent node.

16. A non-transitory computer-readable storage medium having instructions embodied thereon, the instructions when executed by one or more processors, cause the one or more processors to perform a process comprising:

receiving a plurality of pseudocode statements that include natural-language terms for a high-level representation of hardware behavior;

extracting context information from the pseudocode statements based in part on a context relationships defined in a pseudocode statement file between parent pseudocode statements and an inner context pseudocode statements;

storing each line of pseudocode into a node in a context dependency graph and ordering the graph based on the context relationships in the context information;

translating the pseudocode of each node from the context dependency graph into HDL code modules using a deep neural network; and ordering the HDL code modules based on the context dependency graph to provide a listing of HDL source code.

17. The non-transitory computer-readable storage medium as in claim 16, wherein extracting context information from the pseudocode statements further comprises identifying the context relationships between the plurality of pseudocode statements using at least one of: text indentation, directional graphical arrows in the context dependency graph, bullet points, a hierarchical text marker, or a hierarchical graphical marker.

18. The non-transitory computer-readable storage medium as in claim 16, wherein each node in the context dependency graph stores:

a description field containing a single line of pseudocode representing at least one HDL operation;

a body field where the HDL source code equivalent to the single line of pseudocode is stored; and a pointer to inner context nodes in the context dependency graph that depend on the parent node.

19. The non-transitory computer-readable storage medium as in claim 16, wherein the pointer references the inner context node that represents HDL source code for the parent node.

20. The non-transitory computer-readable storage medium as in claim 16, further comprising a graphical user interface to display each of the plurality of pseudocode statements in a flowchart referencing context by nesting inner context nodes within parent nodes to display context for the nodes.

* * * * *